United States Patent
Hibino et al.

[11] Patent Number: 5,856,889
[45] Date of Patent: *Jan. 5, 1999

[54] MAGNETIC DATA RECORDING APPARATUS USING PULSE POSITION MODULATION

[75] Inventors: Hideo Hibino, Kawasaki; Norikazu Yokonuma, Yokohama; Kazuyuki Kazami, Tokyo; Yoichi Yamazaki, Kawasaki, all of Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 505,963

[22] Filed: Jul. 24, 1995

[30] Foreign Application Priority Data

Aug. 8, 1994 [JP] Japan .................................. 6-185692

[51] Int. Cl.$^6$ .................................. G11B 5/00; G11B 5/02
[52] U.S. Cl. .................................. 360/1; 360/29; 396/319
[58] Field of Search .................................. 354/105, 106; 360/3, 22, 29, 1; 396/319

[56] References Cited

U.S. PATENT DOCUMENTS

| 5,394,387 | 2/1995 | Watanabe | 369/111 |
| 5,416,546 | 5/1995 | Izukawa | 396/319 |
| 5,475,455 | 12/1995 | Hibino et al. | 354/106 |
| 5,502,527 | 3/1996 | Kazami et al. | 354/106 |

FOREIGN PATENT DOCUMENTS

| 0 475 447 A2 | 3/1992 | European Pat. Off. . |
| 4-328536 | 11/1992 | Japan . |

OTHER PUBLICATIONS

Patent Abstracts of Japan, vol. 12, No. 97 (P–682), Mar. 30 1988 for JP 62229571.
Patent Abstracts of Japan, vol. 15, No. 153 (P–1191), Apr. 17, 1991 for JP 3023596.
Patent Abstracts of Japan, vol. 17, No. 98 (P–1494) Feb. 26, 1993 for JP 4293038.
Patent Abstracts of Japan, vol. 18, No. 146, (P–1707), Mar. 10, 1994 for JP5–323443.

*Primary Examiner*—W. R. Young
*Assistant Examiner*—Regina Y. Neal

[57] ABSTRACT

A magnetic data recording apparatus magnetically records various items of data on a film in accordance with a feed of the film by a PPM Pulse Position Modulation (PPM) recording method. The apparatus includes a PPM signal converting circuit for converting the data to be recorded into a PPM signal and outputting the PPM signal, a magnetic head and a head driving circuit for driving the magnetic head on the PPM signal outputted from the PPM signal converting circuit. The apparatus further includes a data quantity calculating circuit for calculating a quantity of the data to be recorded during a feed of the film. The PPM signal converting circuit determines a change-of-signal position of the PPM signal within one period on the data quantity calculated by the data quantity calculating circuit.

7 Claims, 10 Drawing Sheets

MAGNETIC DATA RECORDING APPARATUS USING PULSE POSITION MODULATION

BACKGROUND OF THE INVENTION

1. Field of the Invention

The present invention relates to a magnetic data recording apparatus for magnetically recording various items of data on a film by use of a PPM recording method.

2. Related Background Art

Figure 11:
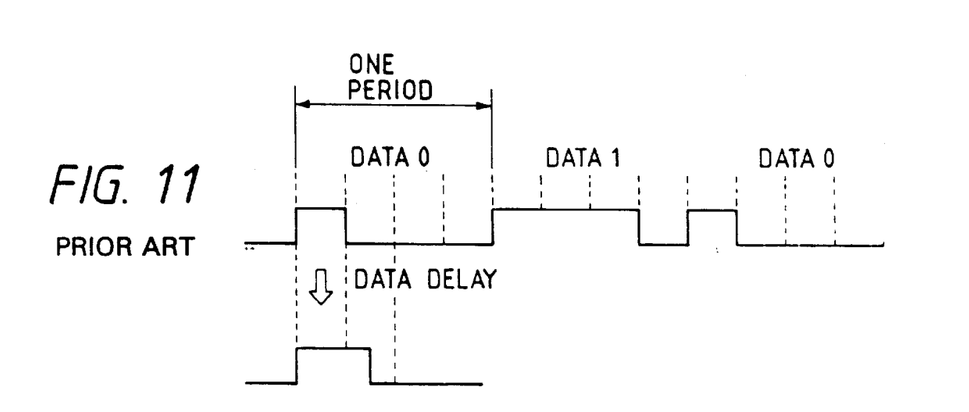
FIG. 11 is a diagram of assistance in explaining the PPM signal.

A known method of performing a magnetic record on a magnetic medium is a PPM (Pulse Position Modulation) recording method. FIG. 11 illustrates a signal waveform based on the PPM recording method.

According to the PPM recording method, a signal period is fixed at all times, and [0] and [1] are discriminated depending on a difference in terms of a change-of-signal-level position within one period. For instance, [0] indicates that a signal waveform changes in a range from an onset of the signal period to a one-half period position, while [1] indicates that the signal waveform changes after the one-half period position. For example, referring to FIG. 11, [0] indicates that the signal period falls at one-fourth the period from the onset of the signal period (this is referred to as a bit location 25% PPM signal), while [1] indicates that the signal period falls at three-fourths the period from the onset of the signal period (this is referred to as a bit location 75% PPM signal).

With this arrangement, even if a falling position of the signal period deviates to some extent due to a delay, etc. on the data line, the data can be transmitted correctly. That is, referring to FIG. 11, when transmitting the data [0], and even if the data which is to fall originally in a one-fourth period position from the onset thereof falls with some time-lag due to the delay, etc. on the data line, the data [0] can be recognized on condition that a signal waveform falls within the one-half period. Consequently, a transmission error of the data is hard to occur.

There is known a camera constructed to magnetically record data about photographing such as a date and exposure data, etc. by use of a PPM recording method. In this type of camera, converting the data about the photographing into PPM signals may, it can be considered, involve (1) a software-oriented converting method by use of a CPU or the like incorporated into the camera and (2) a hardware-oriented converting method by providing a PPM signal converting circuit in the interior of the camera. In the case of the (1) method, it is a general practice that a change-of-signal position of the PPM signal is managed by use of a timer. For instance, when outputting [1] of the PPM signal, the timer measures a time from the onset of one period up to 75%. When reaching the 75% position, the signal is switched over from HIGH level to LOW level. When the change-of-signal position is controlled by the timer, however, the CPU is occupied by this processing during an output of the PPM signal, and, meanwhile, other processes are therefore interrupted. Making a preparation for photographing is likely to be time-consuming. For this reason, a CPU exhibiting an excellent processing capability has to be used, and this may be a factor for increasing the costs. On the other hand, in the case of (2) method, a PPM converting circuit has to be provided outwardly of the CPU, resulting in the increment in the costs. At the same time, downsizing of the camera is hindered by an addition of the circuit.

Further, a temperature of a magnetic driving circuit in the magnetic data recording apparatus tends to rise during its operation. If this circuit is composed of an IC, the IC may be damaged due to a rise in the internal temperature thereof.

SUMMARY OF THE INVENTION

It is a primary object of the present invention to provide a magnetic data recording apparatus capable of correctly magnetically recording data even if a feeding speed of a film and a record data quantity vary when performing the magnetic record on the film by a PPM recording method.

It is another object of the present invention to provide a magnetic data recording apparatus capable of preventing damage derived from an abnormality in temperature.

To accomplish the above objects, according to the present invention, a magnetic data recording apparatus magnetically records various items of data on a film in accordance with a feed of the film by a PPM recording method. The magnetic data recording apparatus comprises a PPM signal converting circuit for converting the data to be recorded into a PPM signal and outputting the PPM signal, a magnetic head and a head driving circuit for driving the magnetic head on the basis of the PPM signal outputted from the PPM signal converting circuit. The apparatus further comprises a data quantity calculating circuit for calculating a quantity of the data to be recorded during a feed of the film. The PPM signal converting circuit determines a change-of-signal position of the PPM signal within one period on the basis of the data quantity calculated by the data quantity calculating circuit. With this construction, even if the film feeding speed varies midway right in the middle of performing the magnetic record on the film, the magnetic record can be stably effected.

The PPM signal converting circuit preferably makes the change-of-signal position closer to the one-half period position within one period with a larger data quantity calculated by the data quantity calculating circuit. With this arrangement, it is possible to keep a magnetic record state well on the film without making a pulse width within one period too small even when the film feeding speed varies during the magnetic record.

Further, the PPM signal converting circuit preferably sets the period of the PPM signal to a plurality of multiples of the period of the clock having the predetermined frequency and determines the change-of-signal position on the basis of the clock. This makes it possible to convert various items of data into the PPM signals easily and quickly.

Preferably, the magnetic data recording apparatus further comprises a feeding speed detecting circuit for detecting the feeding speed of the film. In this case, the PPM signal converting circuit preferably determines a period of the PPM signal in accordance with the feeding speed detected by the feeding speed detecting circuit. With this arrangement, even if the film feeding speed changes due to fluctuations in power supply voltage, all items of data can be magnetically recorded on the film. Alternatively, in the above case, the PPM signal converting circuit preferably determines the period of the PPM signal in accordance with the data quantity calculated by the data quantity calculating circuit and the feeding speed detected by the feeding speed detecting circuit. This makes it possible to magnetically record all the data on the film irrespective of the film feeding speed and the data quantity.

Further, the magnetic data recording apparatus preferably further comprises a temperature detecting circuit for detecting a temperature of the head driving circuit. In this case, when the temperature of the head driving circuit that is detected by the temperature detecting circuit exceeds a predetermined value, the head driving circuit preferably is inhibited from its operation. A damage to the apparatus due to a temperature abnormality can be thereby prevented.

The above and other objects and advantages of the present invention are explained hereinafter and may be better understood by reference to the drawings and the descriptive matter which follows.

DETAILED DESCRIPTION OF THE PREFERRED EMBODIMENTS

[First Embodiment]

A first embodiment of a magnetic data recording apparatus according to the present invention will be discussed with reference to FIGS. 1 through 6, 7A and 7B. Explained is this embodiment wherein the magnetic data recording apparatus is incorporated into an interior of a camera.

Figure 1:
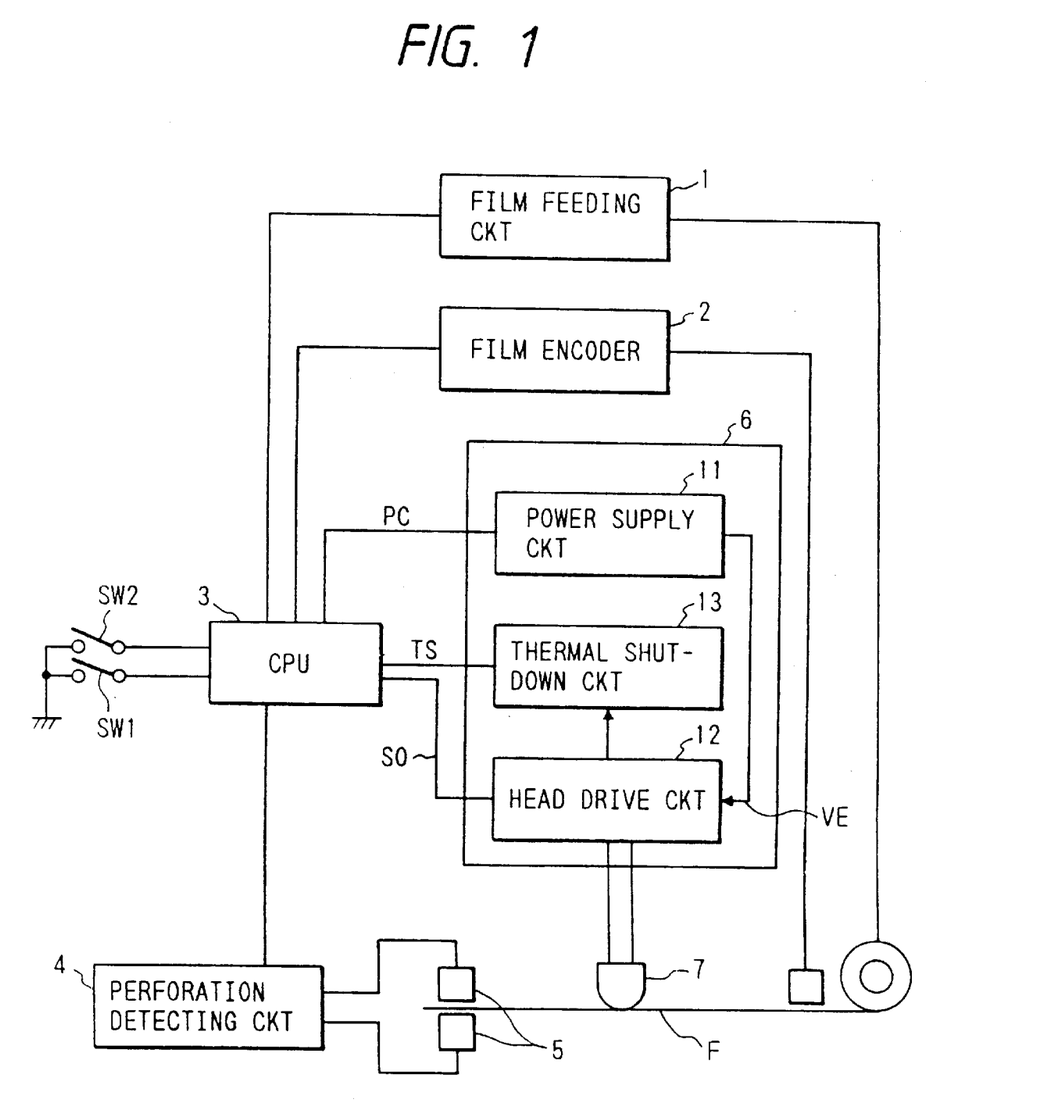
FIG. 1 is a block diagram showing a first embodiment of a magnetic data recording apparatus according to the present invention.

FIG. 1 is a block diagram illustrating a whole construction of the magnetic data recording apparatus. The magnetic data recording apparatus comprises a film feeding circuit 1 for feeding a film F, a film encoder 2 for detecting a feeding speed and a feeding quantity of the film F and a CPU 3. The CPU 3 controls respective elements of the camera in addition to CPU processing. Connected to the CPU 3 are a switch SW1 turned ON when half-depressing a release button and a switch SW2 turned ON when full-depressing the release button. The magnetic data recording apparatus further comprises a perforation detecting circuit 4 for detecting a perforation formed in the film. Inputted to this perforation detecting circuit 4 are signals from photo interrupters 5 disposed in a face-to-face relationship with the film F interposed therebetween. Note that photo reflectors may substitute for the photo interrupters 5.

The magnetic data recording apparatus further comprises a head drive IC 6 for controlling a drive of a magnetic head 7. A power supply circuit 11, a head drive circuit 12 and a thermal shut-down circuit 13 are provided in an interior of this head drive IC. The power supply circuit 11 among these elements performs a switchover as to whether or not a voltage is supplied to the head drive circuit 12 in accordance with an indication given from the CPU 3. The head drive circuit 12 controls a direction of an electric current and a quantity of the current flowing across the magnetic head 7. The thermal shut-down circuit 13 outputs, when a temperature of the head drive IC 6 rises over a predetermined temperature, a signal TS for detecting an abnormality in temperature.

Figure 2:
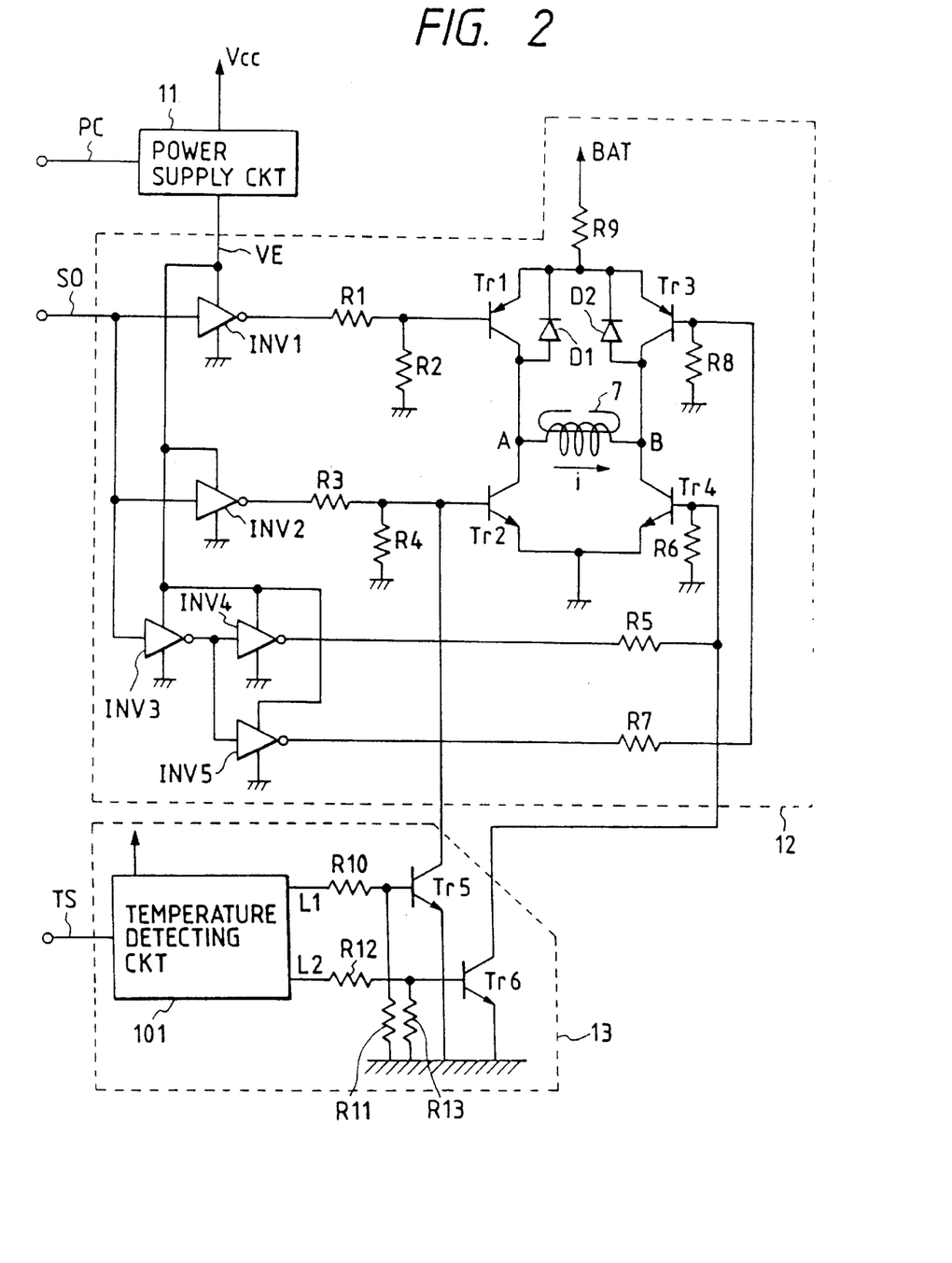
FIG. 2 is a circuit diagram showing an interior of a head drive IC shown in FIG. 1.
Figure 3:
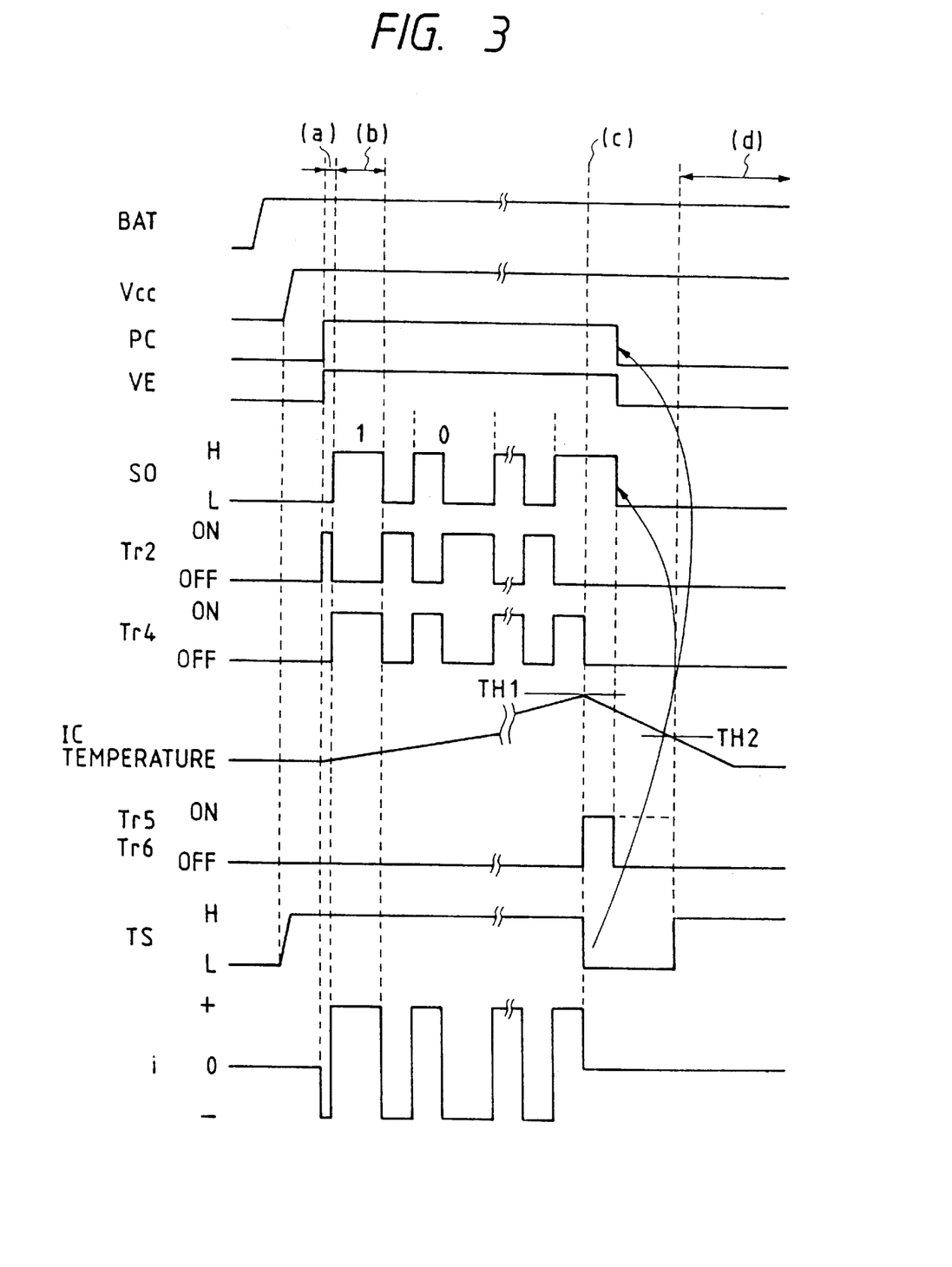
FIG. 3 is a timing chart showing the operation of FIG. 2.

FIG. 2 is a circuit diagram illustrating the interior of the head drive IC 6. FIG. 3 is a timing chart showing the operations of FIG. 2. As shown in FIG. 2, the head drive circuit 12 is constructed of inverters INV1–INV5 each for inverting a level of the PPM signal outputted from the CPU 3 and transistors Tr1–Tr4 for effecting ON/OFF switching in accordance with a direction of the current flowing across the magnetic head 7. The head drive circuit 12 is further constructed of resistors R1–R8 interposed between the transistors Tr1–Tr4 and the inverters INV1–INV5, diodes D1, D2 each for restraining a surge voltage generated in the magnetic head 7 and a resistor R9 for regulating a quantity of the current flowed to the transistors Tr1–Tr4.

On the other hand, the thermal shut-down circuit 13 is constructed of a temperature detecting circuit 101, transistors Tr5, Tr6 and resistors R10–R13. The temperature detecting circuit 101 determines whether a temperature of the head drive circuit 12 is a fiducial temperature or above and, if over a first fiducial temperature, sets the signal line TS at LOW level but signal lines L1, L2 at HIGH level. Thereafter, the temperature detecting circuit 101, when under a second fiducial temperature, sets the signal line TS at HIGH level but the signal lines L1, L2 at LOW level.

The operation of the head drive IC 6 will be explained with reference to the timing chart of FIG. 3. The power supply circuit 11 is, as illustrated in FIG. 2, connected via a signal line PC to the CPU 3. When the CPU 3 sets the signal line PC at HIGH level, the power supply circuit 11 supplies power voltages to the inverters INV1–INV5 within the head drive circuit 12 via a signal line VE. The PPM signals outputted from the CPU 3 are inputted to base terminals of the transistors Tr1–Tr4 via a signal line SO, the inverters INV1–INV5 and the resistors R1, R3, R5, R7 as well.

Herein, when the signal line SO is at LOW level (region (a) in FIG. 3), the outputs of the inverters INV1–INV3 assume HIGH level, while the outputs of the inverters INV4, INV5 assume LOW level. Consequently, the transistors Tr2, Tr3 switched ON, whereas the transistors Tr1, Tr4 are switched OFF. Accordingly, the current from an unillustrated battery flows such as: resistor R9→transistor Tr3→magnetic head 7→transistor Tr2. That is, the current flows across as illustrated by B→A. Reversely when the signal line SO is at HIGH level (region (b) in FIG. 3) the outputs of the inverters INV1–INV3 assume LOW level, while the outputs of the inverters INV4, INV5 assume HIGH level. Consequently, the transistors Tr2, Tr3 are switched OFF, whereas the transistors Tr1, Tr4 are switched ON. Accordingly, the current from the battery flows such as: resistor R9→transistor Tr1→magnetic head 7→transistor Tr4. That is, the current flows across the magnetic head 7 as illustrated by A→B. When the direction of the current flowing across the magnetic head 7 changes, a direction of magnetization on the film kept in contact with the magnetic head 7 also changes.

If the temperature of the head drive circuit 12 exceeds the first fiducial temperature TH1 right in the middle of the current flowing across the magnetic head 7 in the A→B direction ((c) in FIG. 3), the temperature detecting circuit 101 sets the signal line TS at LOW level but the signal lines L1, L2 at HIGH level. Consequently, both of the transistors Tr5, Tr6 are switched ON; both of the base terminals of the transistors Tr2, Tr4 which are connected to the collector terminals of the transistors Tr5, Tr6 assume LOW level; and both of the transistors Tr2, Tr4 are switched OFF. Accordingly, no current flows across the magnetic head 7, thus halting the magnetic record on the film F.

As described above, the thermal shut-down circuit 13 shown in FIG. 2, when over the first fiducial temperature TH1, forcibly switches OFF the transistors Tr2, Tr4 within the head drive circuit 12 to shut down a flow of current to the magnetic head 7.

Thereafter, when the temperature gradually decreases under a second fiducial temperature TH2 (region (d) in FIG. 3), the temperature detecting circuit 101 sets the signal line TS at HIGH level but the signal lines L1, L2 at LOW level. When the signal line TS assumes HIGH level, the CPU 3 recognizes that the temperature has been lowered and therefore transmits again the PPM signal via the signal line SO.

FIGS. 4A to 4D are diagrams of assistance in explaining a method of creating the PPM signal by the CPU 3.

In this embodiment, the magnetic record is performed by making use of a movement of the film F during a film winding period, and, hence, it is required that the magnetic record for one frame be completed for the duration of one-frame winding of the film F. For this reason, if there is a large amount of data to be recorded, a data density has to increase, i.e., the period of the PPM signal has to decrease.

On the other hand, as stated above, according to the PPM recording method, [0] and [1] are discriminated depending on the difference in terms of the change-of-signal-level position during one period. For example, when outputting [1], the signal level is changed posterior to a one-half period position within one period but changed, when outputting [0], anterior to the one-half period position.

Figure 4A:
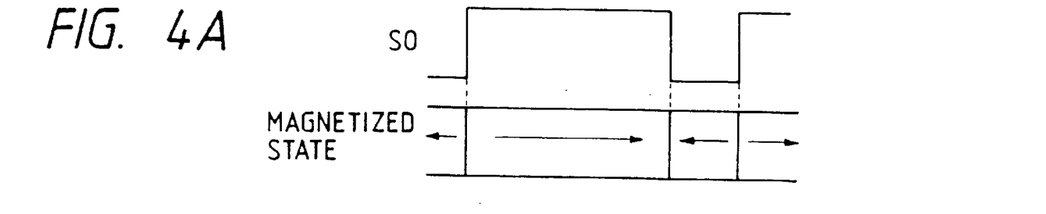
FIGS. 4A to 4D are diagrams each showing how a magnetized state on a film varies corresponding to a film feeding speed.
Figure 4B:
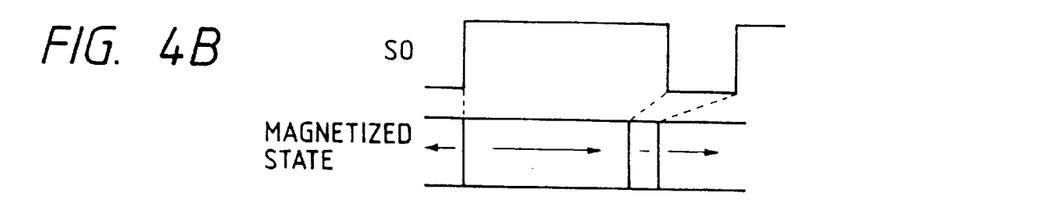
Figure 5:
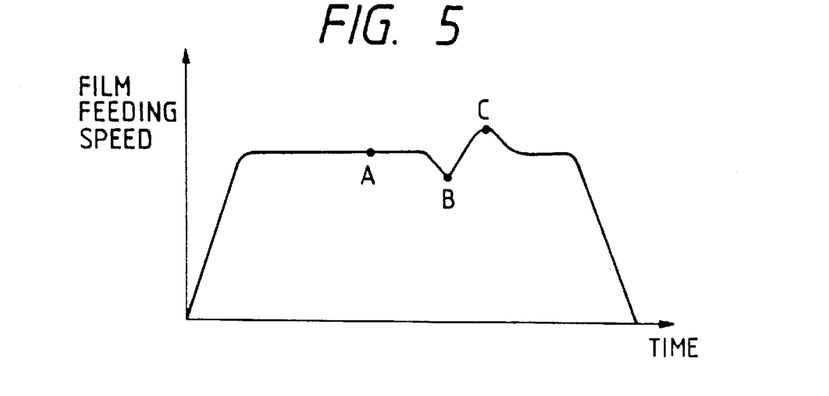
FIG. 5 is a diagram showing a variation in film feeding speed for a time when one frame of the film is wound up.

Further, the feeding speed of the film F is not constant at all times but fluctuates with a passage of time as illustrated in FIG. 5. FIG. 4A illustrates a magnetized state on the film in the case of magnetically recording [1] of the PPM signal when the film feeding speed is, e.g., at a point A in FIG. 5. Referring to FIG. 4A, a rightward arrow head indicates a magnetized state exhibiting HIGH level, while a leftward arrow head indicates a magnetized state exhibiting LOW level. On the other hand, a magnetized state goes as illustrated in FIG. 4B at a point B where the film feeding speed is lower than at the point A, and the magnetized region on the film is smaller than at the point A. That is, there is attained a higher density record on the film F at a slower film feeding speed.

There are a large amount of data to be magnetically recorded on the film F, however, the data are originally required to be recorded on the film F with a high density, and, at this time, if the film feeding speed slows down as seen at the point B in FIG. 5, it follows that the data are recorded on the film F with the high density. Therefore, when recording [1] of the PPM signal, the LOW-level magnetized region is extremely shortened, and there exists a possibility in which the magnetized state does not change from the rightward arrowhead to the leftward arrowhead. Accordingly, when the PPM signal period is short, i.e., in the case of having a large amount of record data, it is desirable that the change-of-signal-level position be proximal to the one-half period position within one period.

Figure 4C:
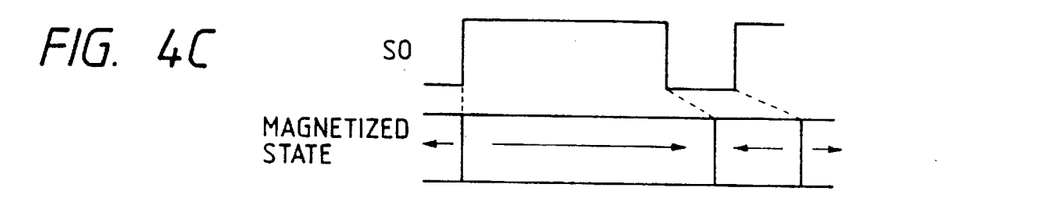
Figure 4D:
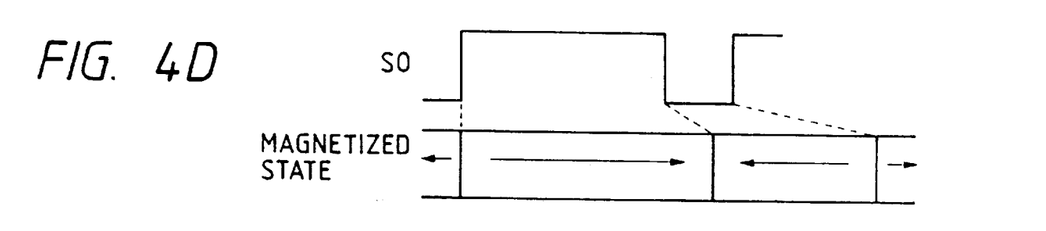

Whereas if the feeding speed of the film F slows down as seen at a point C in FIG. 5, the magnetized region on the film elongates as shown in FIG. 4C. On the other hand, when the PPM signal period is large, i.e., in the case of having a small amount of magnetic record data, the magnetized region on the film elongates. In the case of the large PPM signal period, however, and if the film feeding speed happens to increase midway through one period, as illustrated in FIG. 4D, a LOW-level period of the signal level becomes larger than in FIG. 4C. Hence, if the change-of-signal-level position in the case of outputting [1] of the PPM signal is made close to the one-half period position of the one period, there is eliminated a difference in length between the HIGH-level magnetized region and the LOW-level magnetized region, and it is likely to be impossible to clearly discriminate whether [1] or [0] has been recorded.

Hence, when the PPM signal period is large, viz., in the case of having a small amount of magnetic record data, it is better to set the change-of-signal-level position far from the one-half period position.

From the above-mentioned, in this embodiment, according to the quantity of the magnetic record data, the change-of-signal-level position is shifted as follows:

(1) when having a large amount of data: [0] is 33%, and [1] is 66%; and (2) when having a small amount of data: [0] is 25%, and [1] is 75%.

Figures 6, 6A:
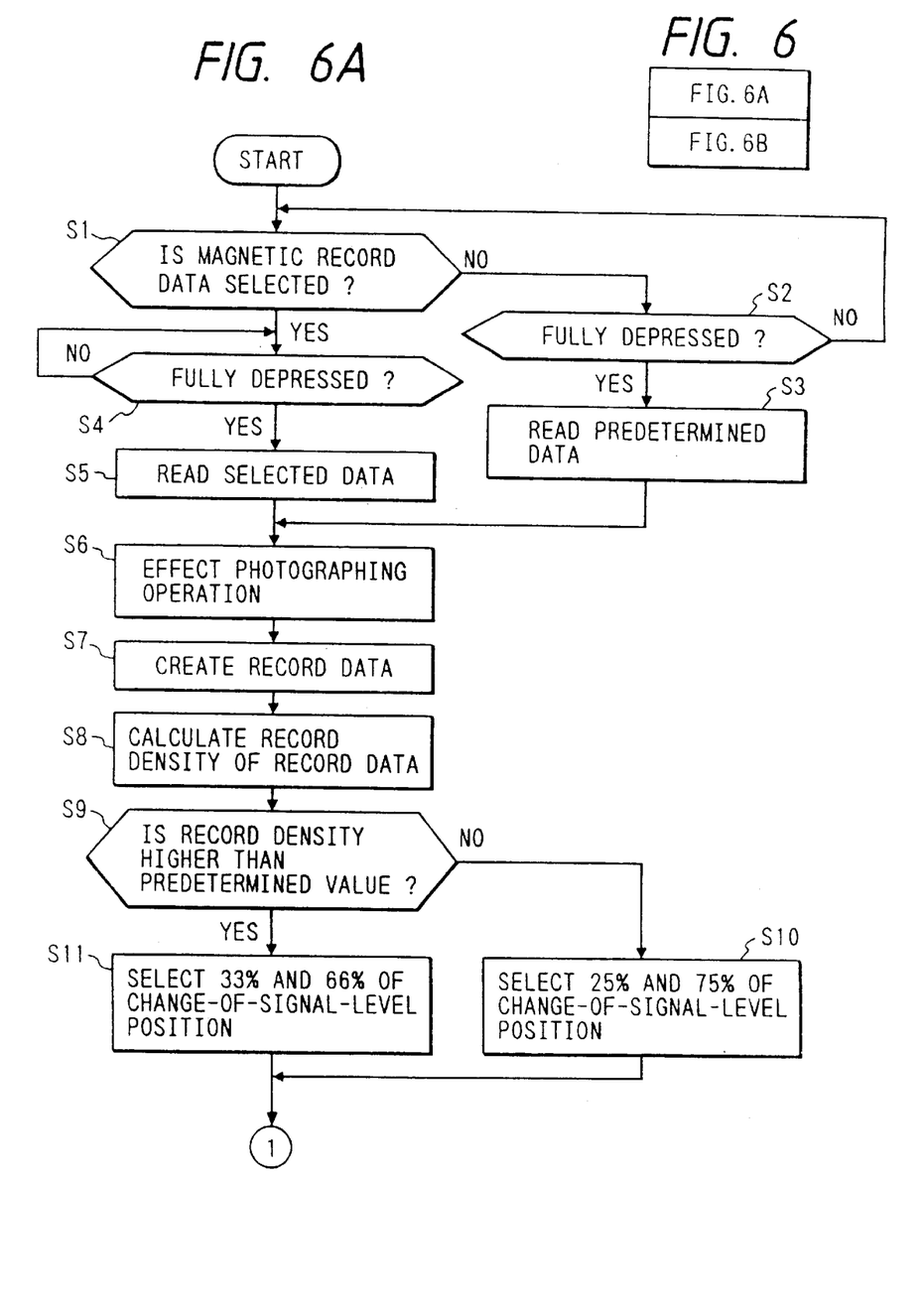
FIG. 6 is comprised of FIGS. 6A and 6B showing a flowchart illustrating the operations of a CPU.

FIG. 6 is a flowchart showing the operations of the CPU 3, wherein the CPU 3 starts executing the processing in this flowchart upon half-depressing the release button.

In step S1, the CPU 3 determines whether the magnetic record data is selected by an unillustrated selection switch. Items of the magnetic record data on the film are a photographing date, a shutter speed, an aperture quantity and a color temperature or an arbitrary character, etc. designated by a photographer. In accordance with this embodiment, only the data selected by the selection switch is magnetically recorded.

The processing proceeds to step S2 when determined No in step S1, and the CPU 3 determines whether the release button has been fully depressed. The processing, if determined No, goes back to step S1 but, whereas if determined Yes, proceeds to step S3. In step S3, the predetermined data is read. The process in step S3 is executed in such a case that the photographer does not select the magnetic record data by the selection switch. In this case, default data is to be magnetically recorded.

If determined Yes in step S1, the processing goes forward to step S4, wherein the CPU 3 determines whether the release button is fully-depressed. If determined No, the processing remains in step S4 but, whereas if determined Yes, proceeds to step S5. In step S5, after reading the selected data, the processing proceeds to step S6.

In step S6, the photographing operations such as shutter control, etc. are to be performed. In step S7, the record data are created based on the data read in step S3 or S4. In step S8, a record density of the record data is calculated, and step S9 determines whether the record density is higher than a predetermined value. If determined No, (not higher) the processing proceeds to step S10, wherein the change-of-signal-level position is set to 25% and 75%, and the record data is converted into the PPM signal. On the other hand, if determined Yes (is higher) in step S9, the processing proceeds to step S11, wherein the change-of-signal-level position is set to 33% and 66%, and the record data is converted into the PPM signal.

When finishing the process in step S10 or S11, the processing proceeds to step S12, wherein the signal is transmitted to the film feeding circuit 1 to start feeding the film F. In step S13, the signal line PC is set at HIGH level. The power supply circuit 11 of the head drive IC 6 shown in FIG. 2 supplies power voltages to the inverters INV1–INV5.

In step S14, a film feeding speed is detected by use of the film encoder 2. In step S15, a record frequency of the record data is calculated based on the film feeding speed. In step S16, the PPM signal created in step S10 or S11 is transferred to the head drive IC 6 at the record frequency calculated in step S15. This transfer is performed via the signal line SO.

In step S17, the CPU 3 determines whether the signal line TS assumes LOW level or not, i.e., whether the temperature is abnormal or not. If determined No, the processing proceeds to step S18, wherein the CPU 3 determines whether or not the transfer of all items of data is finished. If determined No, the processing returns to step S16 but, whereas if determined Yes, proceeds to step S19.

In step S19, the CPU 3 determines whether the film F is wound up by one frame. This determination is made with the aid of the perforation detecting circuit 4. If determined No, the processing remains in step S19 but, whereas if determined Yes, proceeds to step S20. In step S20, the feed of the film F is halted, thus ending the processing.

On the other hand, if determined Yes in step S17, the processing goes forward to step S21, in which the output of the PPM signal from the signal line SO is halted, and the processing returns to step S17. Thereafter, when the temperature in the interior of the head drive IC 6 is the second fiducial temperature or under, the signal line TS assumes HIGH level. Hence, a determination made in step S17 is No, and the magnetic record resumes.

Note that the magnetic record resumes when reset normally in this embodiment. However, the resumption does not necessarily have to be made, the magnetic record may be re-performed by rewinding one frame once again after giving an error indication.

To summarize the above processes in FIG. 6, the data quantity is detected by reading the magnetic record data, and the change-of-signal-level position of the PPM signal is determined based on this data quantity. Next, the film feeding speed is detected, and the PPM signal is outputted at the frequency corresponding to the feeding speed. The CPU 3 monitors the signal level through the signal line TS for the duration of outputting the PPM signal. The CPU 3, when changed to LOW level, determines that the abnormality in temperature happens in the head drive IC 6, halts the data output. Further, the CPU 3 also monitors whether or not the film F moves to the perforation position and, when moving to the perforation position, halts the feed of the film.

Figure 6B:
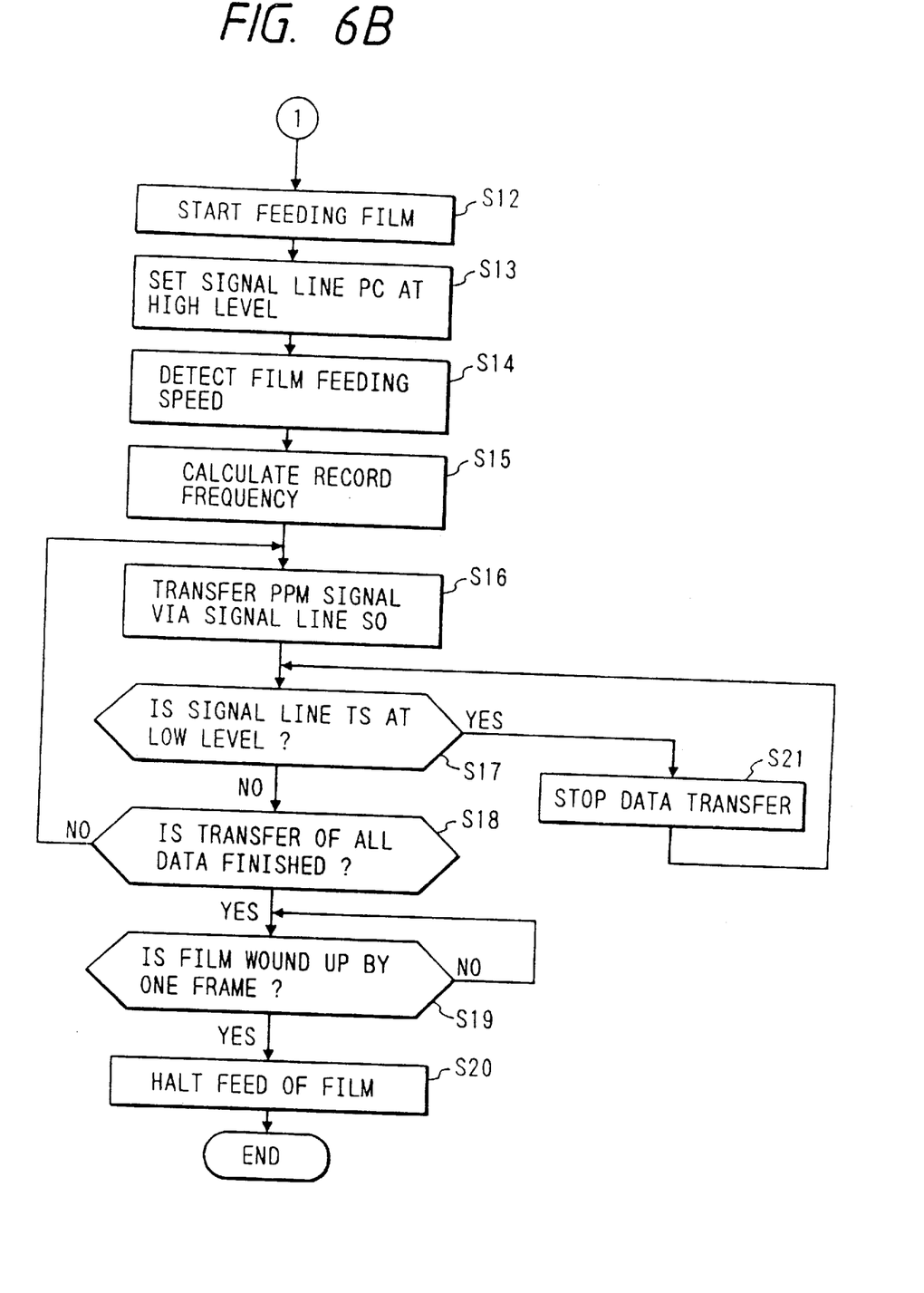
Figure 7A:
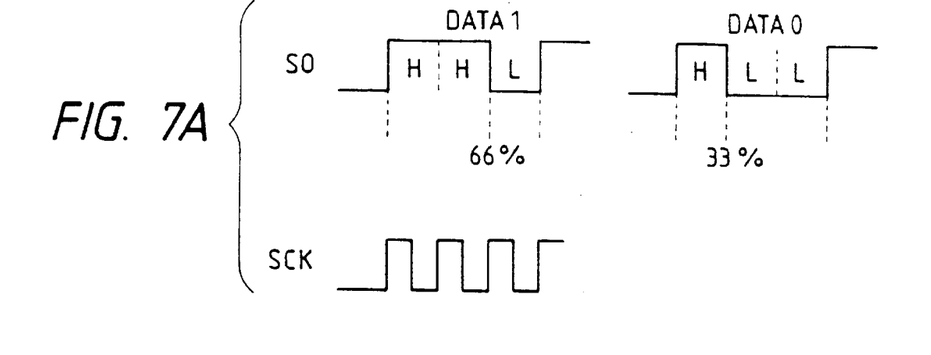
FIGS. 7A and 7B are diagrams illustrating a relationship between a fiducial clock and a PPM signal.
Figure 7B:
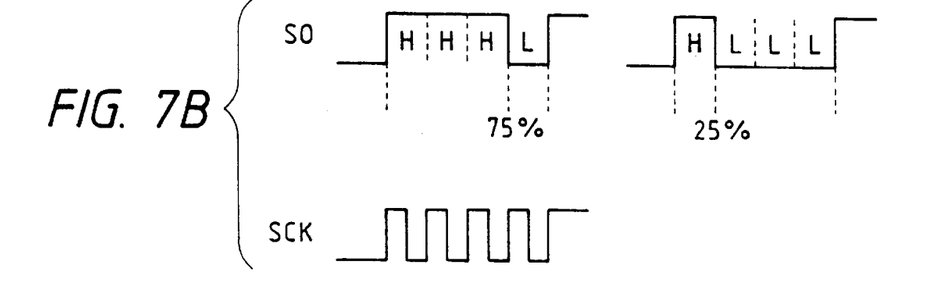

FIGS. 7A and 7B show specific examples of the step S16 in FIG. 6B, wherein serial data [101] is converted into the PPM signal and then transferred. FIG. 7A shows the example where three periods of a fiducial clock SCK inputted to the CPU 3 are set as one period of the PPM signal, and, with respect to the change-of-signal position within one period, [0] is 33%, while [1] is 66%. On the other hand, FIG. 7B shows the example where four periods of the fiducial clock SCK are set as one period of the PPM signal, and the change-of-signal position within one period is set to 25% and 75%.

In any examples of FIGS. 7A and 7B, the CPU 3 sets the change-of-signal position within one period to a multiple-of-integer position of the fiducial clock SCK as well as setting a plurality of multiples of the fiducial clock SCK as one period of the PPM signal.

Thus, when using the fiducial clock SCK, the serial data can be converted into the PPM signal easily and quickly.

As explained above, in the first embodiment, when the internal temperature of the head drive IC 6 exceeds the first fiducial temperature, the output of the PPM signal from the CPU 3 is halted, and, at the same time, the record current does not flow across the magnetic head 7. It is therefore possible to surely restrain a rise in temperature within the head drive IC 6.

Further, the CPU 3, when creating the PPM signal, shifts the change-of-signal position of the PPM signal in accordance with the quantity of the data to be recorded, and, hence, the magnetized state on the film can be stabilized at all times even with a change in the film feeding speed during the magnetic record.

Furthermore, the frequency of the PPM signal is determined corresponding to the film feeding speed, and therefore all items of data down to the minutest detail can be magnetically recorded even in the case of the large amount of data.

[Second Embodiment]

A second embodiment presents a more simplified internal construction of the head drive IC 6 than in the first embodiment. All the elements other than this are common to the first embodiment, and, hence, only the construction and the operation of the head drive IC will hereinafter be described.

Figure 8:
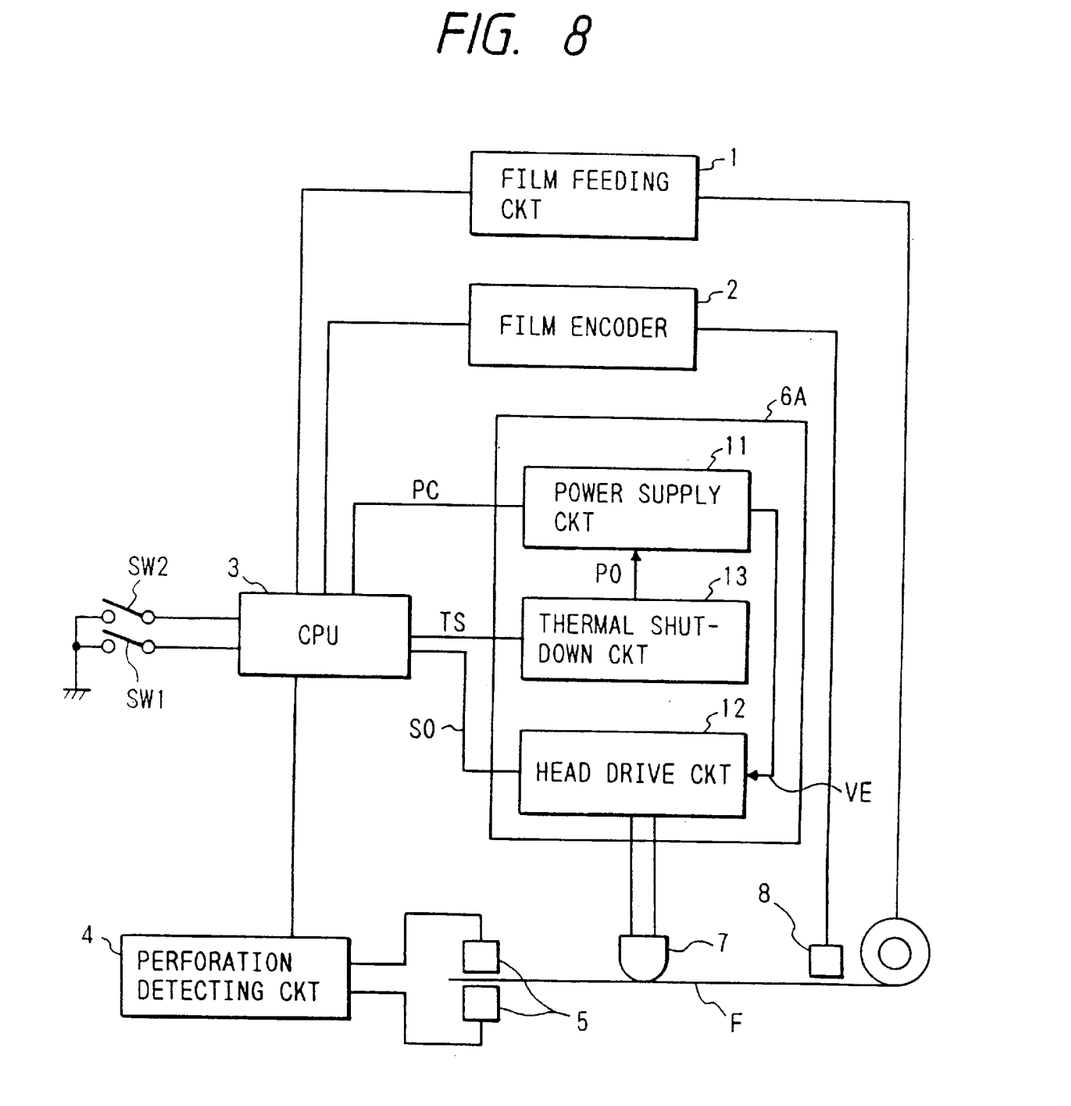
FIG. 8 is a block diagram illustrating a second embodiment of the magnetic data recording apparatus according to the present invention.
Figure 9:
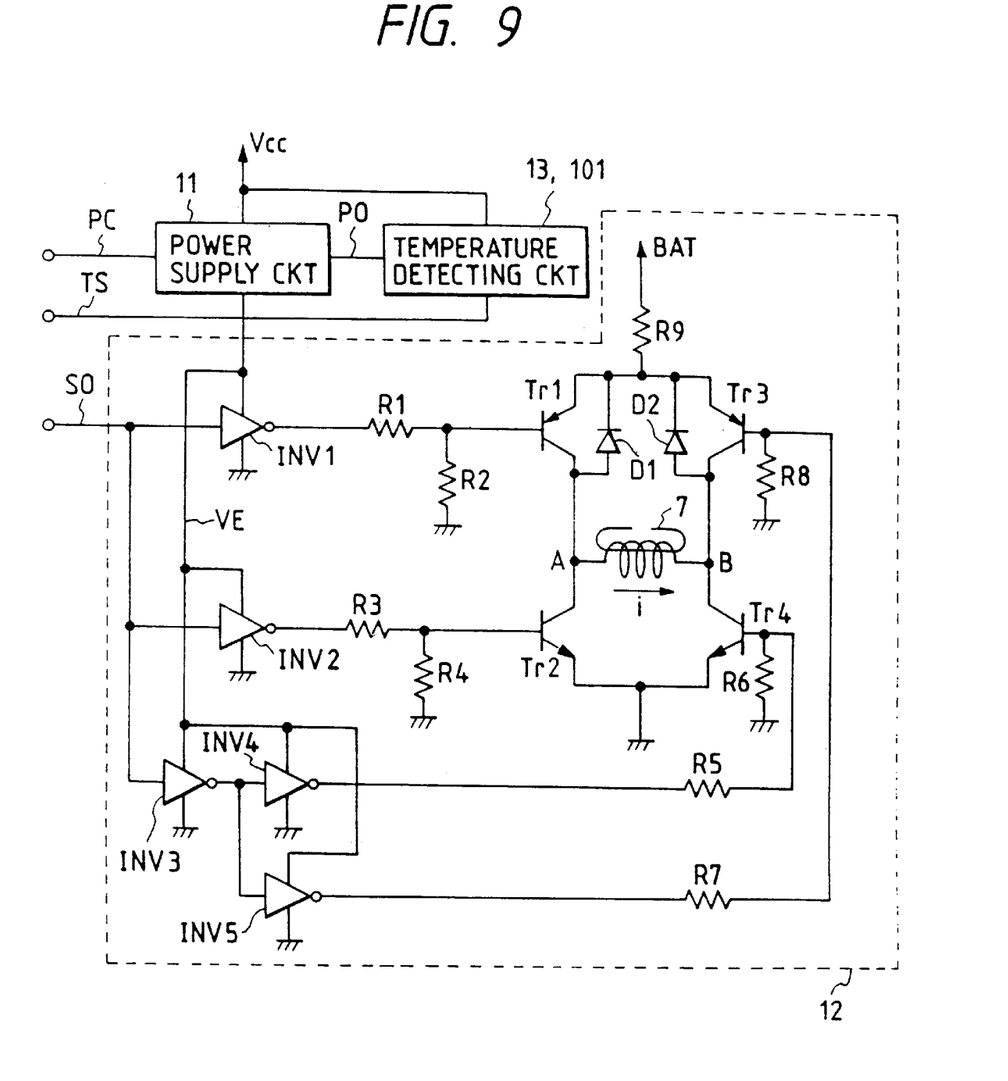
FIG. 9 is a circuit diagram illustrating an interior of the head drive IC shown in FIG. 8.
Figure 10:
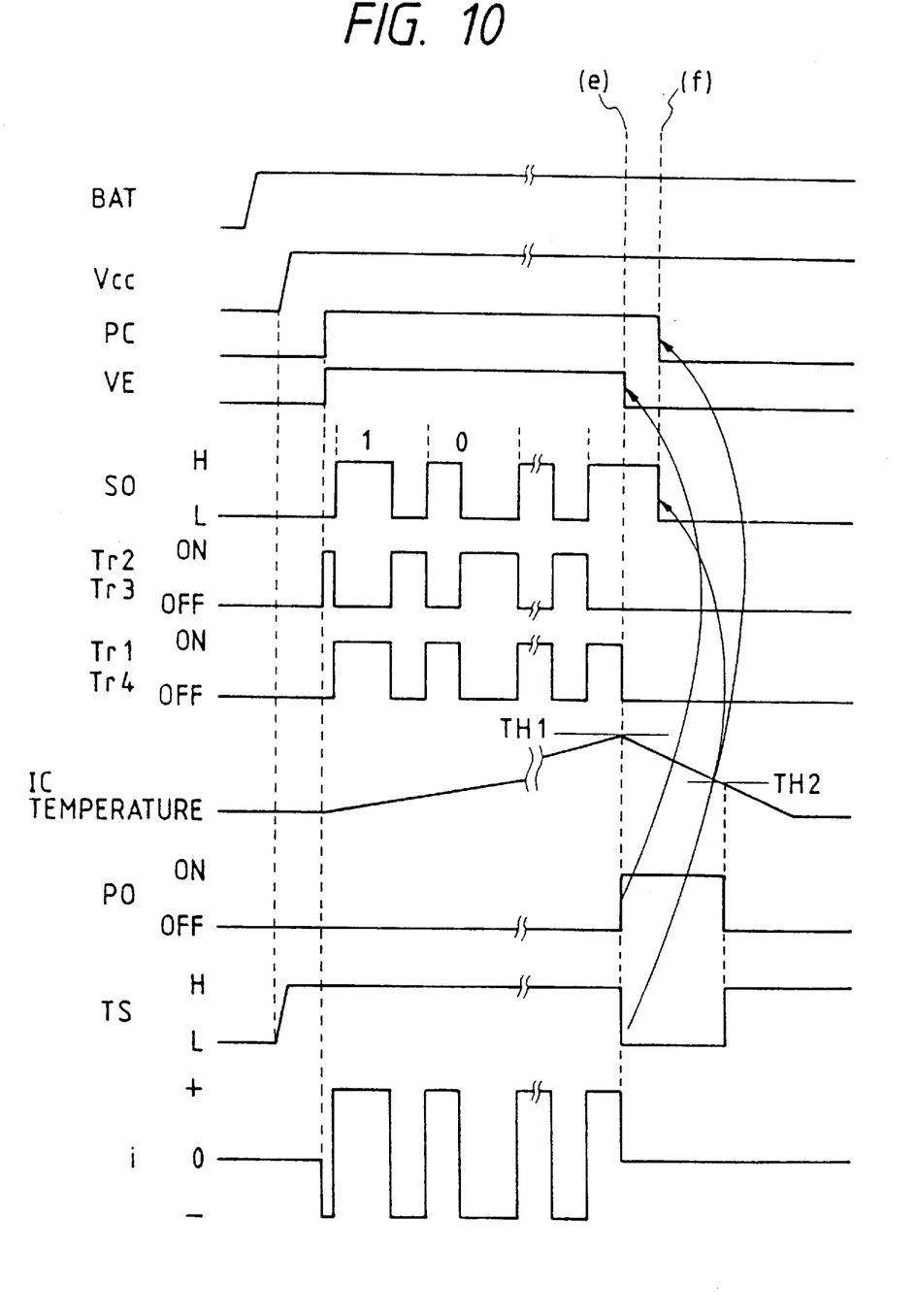
FIG. 10 is a timing chart showing operations of FIG. 9.

FIG. 8 is a block diagram illustrating a whole construction of the second embodiment of the magnetic data recording apparatus. FIG. 9 is a circuit diagram illustrating an interior of a head drive IC 6A in the second embodiment. FIG. 10 is a timing chart showing operations of the circuit shown in FIG. 9. Referring to FIGS. 8 and 9, the elements common to those in FIGS. 1 and 2 are marked with the like numerals, and the discussion which follows will be concentrated on different points therebetween. A temperature detecting circuit 101 in FIG. 9 is connected via the signal line PO to the power supply circuit 11. When the internal temperature of the head drive circuit 6A is the first fiducial temperature or above, the temperature detecting circuit 101 sets the signal line at HIGH level. The power circuit 11 in FIG. 8, when the signal line PO assumes HIGH level, sets a signal line VE at LOW level. That is, when reaching the first fiducial temperature, the power circuit 11 halts the supply of the power voltages to the inverters INV1–INV5.

The operation of the head drive IC 6A in the second embodiment will hereinafter be described with reference to a timing chart of FIG. 10.

When the internal temperature of the head drive IC 6A comes to the first fiducial temperature TH1 or higher ((e) in FIG. 10), the temperature detecting circuit 101 sets the signal line PO at HIGH level but the signal line TS at LOW level. With this setting, the power supply circuit 11 sets the signal line VE at LOW level and thus halts the voltage supply to the inverters INV1–INV5. Accordingly, both of the transistors Tr2, Tr4 are switched OFF, with the result that no current flows across the magnetic head 7. On the other hand, the CPU 3, upon detecting that the signal line TS assumes HIGH level, sets the signal line PC at LOW level ((f) in FIG. 10). The signal through this signal line PC is inputted to the power supply circuit 11, and therefore the power supply circuit 11 sets the signal line VE at LOW level even if the signal line VE is not at LOW level.

Thus, in accordance with the second embodiment, the signals indicating whether or not there happens the temperature abnormality are inputted via the two signal lines to the power supply circuit 11. Therefore, in case one of these signal lines is disconnected, the power supply circuit 11 is capable of detecting the temperature abnormality and surely halting the voltage supply to the inverters when the temperature abnormality happens. Further, unlike the first embodiment, the base terminal of the transistor is not controlled, and, hence, the circuit can be more simplified than in the first embodiment.

In each of the embodiments described above, the signal level of the PPM signal is changed from HIGH to LOW within one period but may be changed from LOW to HIGH. Further, the change-of-signal position of the PPM signal is not confined to those shown in the embodiments.

In steps S9–S11 of FIG. 6A, there are provided two kinds of change-of-signal positions. The change-of-signal positions may be, however, shifted more minutely corresponding to the data quantity.

The embodiment discussed above has presented the example where the power supply circuit 11, the thermal shut-down circuit 13 and the head drive circuit 12 are integrated on one chip and then incorporated into the head drive IC 6, but all these circuits may be constructed of individual parts.

In accordance with the first embodiment discussed above, when the temperature detecting circuit 101 detects the temperature abnormality, the transistors Tr5, Tr6 are switched OFF. However, instead of switching OFF the transistors Tr5, Tr6, for example, the practice may also be such that the battery voltage is not supplied to the resistor R1. That is, any kind of control may be carried out on condition that no current flows across the magnetic head when the temperature abnormality happens.

In step S15 of FIG. 6B, the record frequency of the PPM signal is determined based on the film feeding speed. The record frequency may be, however, determined in consideration of both of the data quantity and the film feeding speed that are obtained in step S8.

It is apparent that, in this invention, a wide range of different working modes can be formed based on the invention without deviating from the spirit and scope of the invention. This invention is not restricted by its specific working modes except being limited by the appended claims.

What is claimed is:

1. A magnetic data recording apparatus for magnetically recording various items of data on a film in accordance with a feed of the film by a pulse position modulation (PPM) recording method, said apparatus comprising:

a PPM signal converting circuit to convert the data to be recorded into a PPM signal consisting of a plurality of pulses and to output the PPM signal;

a magnetic head;

a head driving circuit to drive said magnetic head on the basis of the PPM signal outputted from said PPM signal converting circuit; and a data quantity calculating circuit to calculate a quantity of the data to be recorded during a feed of the film, wherein said PPM signal converting circuit determines a ratio of a HIGH level time to a LOW level time of each of said plurality of pulses on the basis of the data quantity calculated by said data quantity calculating circuit.

2. A magnetic data recording apparatus according to claim 1, wherein said PPM signal converting circuit makes the ratio closer to 1 with a larger data quantity calculated by said data quantity calculating circuit.

3. A magnetic data recording apparatus according to claim 2, wherein said PPM signal converting circuit sets a period of the PPM signal to a plurality of multiples of a period of a clock having a predetermined frequency and determines the ratio on the basis of the clock.

4. A magnetic data recording apparatus according to claim 3, further comprising:

a feeding speed detecting circuit to detect a feeding speed of the film;

wherein said PPM signal converting circuit determines a period of the PPM signal in accordance with the feeding speed detected by said feeding speed detection circuit.

5. A magnetic data recording apparatus according to claim 3, further comprising:

a feeding speed detection circuit to detect a feeding speed of the film, wherein said PPM signal converting circuit determines a period of the PPM signal in accordance with the data quantity calculated by said data quantity calculating circuit and the feeding speed detection by said feeding speed detection circuit.

6. A magnetic data recording apparatus according to claim 1, further comprising:

a temperature detecting circuit to detect a temperature of said head driving circuit, wherein said head driving circuit is inhibited from its operation in case a temperature of said head driving circuit that is detected by said temperature detecting circuit exceeds a predetermined value.

7. A magnetic data recording apparatus, comprising:

a data quantity calculating circuit to calculate a quantity of data to be recorded during a feed of a recording member; and a pulse position modulation (PPM) signal converting circuit to convert the data to be recorded into a PPM signal consisting of a plurality of pulses and to output the PPM signal, wherein said PPM signal converting circuit determines a ratio of a HIGH level time to a LOW level time of each of said plurality of pulses on the basis of the data quantity calculated by said data quantity calculating circuit.

* * * * *

UNITED STATES PATENT AND TRADEMARK OFFICE
CERTIFICATE OF CORRECTION

PATENT NO.:    5,856,889
DATED     :    January 5, 1999
INVENTOR(S):   Hideo Hibino et al.

It is certified that error appears in the above-identified patent and that said Letters Patent is hereby corrected as shown below:

On the title page item [56],

"OTHER PUBLICATIONS" change "JP 3023596" to --JP 3023556--.

Signed and Sealed this

Eighth Day of June, 1999

Attest:

Q. TODD DICKINSON

Attesting Officer

Acting Commissioner of Patents and Trademarks